United States Patent Office 3,654,094
Patented Apr. 4, 1972

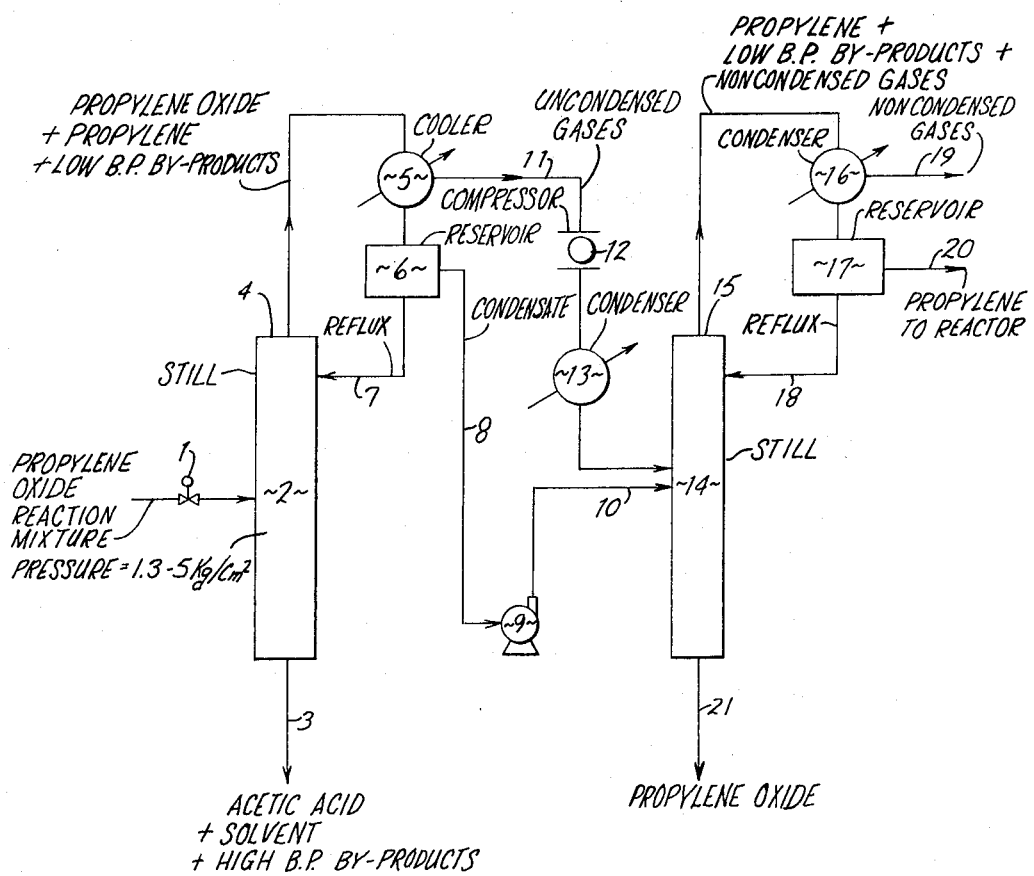

3,654,094
PROCESS FOR PURIFYING PROPYLENE OXIDE BY PLURAL STAGE DISTILLATION
Kazuo Yamagishi, Tokyo, and Osamu Kageyama and Yoshiaki Numa, Ohimachi, Japan, assignors to Daicel, Ltd., Osaka, Japan
Filed Mar. 18, 1970, Ser. No. 20,594
Claims priority, application Japan, Mar. 22, 1969, 44/21,944
Int. Cl. B01d 3/14; C07d 1/08
U.S. Cl. 203—77
3 Claims

ABSTRACT OF THE DISCLOSURE

A process for purifying propylene oxide from a reaction mixture containing propylene oxide, propylene, peracetic acid, acetic acid and the reaction solvent, in which the reaction mixture is distilled under a pressure of 1.3–5.0 kg./cm.$^2$ so that a distillate containing propylene oxide and propylene is discharged from the column head, condensing the distillate and then subjecting the condensed distillate to a second distillation to recover propylene oxide from the bottom of the second distillation column.

BACKGROUND OF THE INVENTION

FIELD OF THE INVENTION

The present invention relates to a process for separating and purifying propylene oxide from a reaction mixture containing propylene, peracetic acid, acetic acid and other impurities. The reaction mixture is obtained by an epoxidizing reaction of propylene with peracetic acid for producing propylene oxide.

DESCRIPTION OF THE PRIOR ART

For manufacturing propylene oxide, there have been known various processes, for example, a process of oxidizing propylene with molecular oxygen in the liquid or gaseous phase; a process of co-oxidizing propylene with an aldehyde; a process of oxidizing propylene with a hydroperoxide; and a process of oxidizing propylene with peracetic acid, etc. Among the above processes, the process of epoxidizing (or oxidizing) propylene using peracetic acid as the oxidizing agent seems most promising at present, because peracetic acid is capable of effecting a highly selective oxidizing action and it is commercially available in large quantities and can be made inexpensively by air-oxidation of acetaldehyde. However, since an effective method for purifying the propylene oxide produced in said process has not been known and since the technical difficulties involved in the separation and purification of propylene oxide from the reaction mixture produced in said process, which will be explained in detail below, had not been effectively solved, said process is actually incomplete as an industrial manufacturing process for propylene oxide.

In the conventional epoxidation process for producing propylene oxide from propylene by oxidizing propylene with peracetic acid, the reaction is usually carried out in an inert solvent such as ethyl acetate, acetone and benzene in order to handle the peracetic acid safely. Such epoxidation process of propylene with peracetic acid has been disclosed, for example, in British Pat. No. 1,076,288 of Knapsack Corp. and the copending U.S. Ser. No. 823,605 filed May 12, 1969 of Yamagishi, Kageyama and Numa. In this reaction, propylene oxide is formed and, simultaneously, most of the peracetic acid is transformed into acetic acid and there are formed small quantities of low boiling by-products, such as acetaldehyde and methanol, and gaseous by-products, such as oxygen and carbon monoxide. Accordingly, the propylene oxide will be obtained in a complicated mixture which also contains unreacted propylene, the solvent used and various by-products such as those mentioned above. The isolation and purification of propylene oxide from said mixture requires a complicated purification process, but the highly reactive nature of propylene oxide, which is the desired end product, makes the purification even more difficult.

For instance, a reaction between propylene oxide and acetic acid easily takes place. Since the concentration of acetic acid in said mixture is quite high, a ring-opening esterification reaction of propylene oxide with acetic acid tends to occur during the course of the purification process of propylene oxide from said mixture. This will result in the formation of propylene glycol esters and will lower the yield of the purified propylene oxide product markedly. For example, British Pat. No. 1,076,288 of Knapsack Corp., discloses a process of separating and purifying propylene oxide, in which the reaction mixture coming out of the reactor is fed to a first still column after the pressure of the mixture has been reduced to an appropriate level. Propylene is separated from the still head at first, while propylene oxide together with acetic acid and the solvent is withdrawn from the column bottom. This propylene oxide mixture is then fed to a second still column, in which the propylene oxide is separated from the acetic acid and the solvent. However, in such a process, propylene oxide will inevitably be lost due to the prolonged contact of propylene oxide with acetic acid in the still column and this will make said purification process less than completely satisfactory as an industrial process.

Further, an absorption process has usually been adopted for the purpose of isolating propylene oxide from a gaseous mixture also containing unreacted propylene and gaseous by-products, but the selection of the absorption solvent will be extremely difficult in such an absorption process, because propylene oxide is highly reactive. If a commonly employed absorption solvent, such as water and propylene glycol, is used, it will react with propylene oxide during the process for stripping the absorbed propylene oxide from the absorption solvent and it will inevitably lower the yield of propylene oxide.

Another problem is encountered in the removal of the slight amount of unreacted peracetic acid present in the reaction mixture. This should be decomposed and removed as rapidly as possible. In order to facilitate the decomposition of the peracetic acid, metallic ions, such as cobalt and manganese ions, can be used as a catalyst. However, if such metallic ions are used, the separation of said metallic ions will result in further difficulties in separating acetic acid and high boiling by-products from the propylene oxide mixture. It is most preferable to employ a method in which peracetic acid will be decomposed merely by heating, but the decomposition of the peracetic acid cannot be accomplished by the usual distillation process, because the column bottom temperature is not high enough to cause the decomposition of peracetic acid. Accordingly, in an ordinary distillation process, peracetic acid will be contained unchanged in the bottom product and it will have a bad influence on the subsequent purification process.

SUMMARY OF THE INVENTION

In the process according to the present invention, the impure propylene oxide reaction mixture obtained by carrying out an epoxidizing oxidation reaction of propylene with peracetic acid as the oxidizing agent, which reaction mixture also contains peracetic acid, acetic acid, propylene and the inert solvent, is first subjected to distillation under pressure, which pressure should be more than 1.3 kg./cm.$^2$ and less than 5 kg./cm.$^2$. This will assure that the bottom temperature of the distillation column will be maintained at not less than 100° C. In this first distillation, the minute amount of unreacted peracetic acid contained in the mixture will be decomposed, while acetic acid will be discharged from the column bottom together with the solvent, thus separating propylene oxide and acetic acid, which are liable to react with each other, as soon as possible. The overhead distillate from the first distillation column comprising a mixture of propylene and propylene oxide obtained from the column head should then be liquefied either by intense cooling and/or compression. The liquefied mixture will then be subjected to a second distillation under pressure, in which propylene oxide is separated from propylene. Thus, by the above process of the present invention, the technical difficulties involved in conventional processes as mentioned above are overcome and an economical process for isolating and purifying propylene oxide in high yields is provided.

BRIEF DESCRIPTION OF DRAWING

The accompanying drawing is a flow sheet for the purpose of explaining the process of the present invention.

DESCRIPTION OF PREFERRED EMBODIMENTS

The present invention will be further described by reference to the accompanying drawing. In the flow sheet shown in the drawing, the reaction mixture comprising propylene oxide, propylene, peracetic acid, acetic acid, the inert solvent such as ethyl acetate, low and high boiling liquid by-products and gaseous by-products, which has been discharged from the reactor (not shown in the drawing), is fed continuously to a middle plate of the first pressure still column 2 after the pressure of said reaction mixture has been controlled to be a pressure in the range of 1.3–5.0 kg./cm.$^2$ by a pressure regulating valve 1. In the column 2, while allowing the thermal decomposition of the unreacted peracetic acid contained in said mixture to proceed, the separation of propylene oxide and acetic acid is carried out as rapidly as possible. Thus, acetic acid, the solvent (such as ethyl acetate) and the high boiling by-products are withdrawn from the column bottom 3. Propylene oxide, propylene, other gases and the low boiling by-products are allowed to distill over the still head 4. The vapor mixture distilled off from the head 4 is cooled by the cooler 5 and a part of the condensate collected in the reservoir 6 is refluxed to the column 1 through the piping 7, while the rest of the condensate is fed to the second pressure still column 14 through the piping 8, the pump 9 and the piping 10. The gases which have not been condensed are passed through the gas compressor 12 or the deep freezing condenser 13, solely or in combination, in order to effect the liquefaction of said gases and they are then fed to the second pressure still column 14. In the second pressure still column 14, propylene oxide is separated from propylene. That is to say, propylene is distilled over the still head 15 with the low boiling by-products and the noncondensing gases. Propylene is condensed in the condenser 16 and is stored in the reservoir 17 and a part of the condensed propylene is refluxed to the still column through the piping 18. The recovered propylene obtained in the reservoir 18 is taken out of the discharge 20 and returned to the reactor. The noncondensing gases such as oxygen are released out of the system from the discharge 19. On the other hand, propylene oxide free of propylene is taken out from the column bottom 21 and may be subjected to an additional distillation, if desired, in order to remove the low boiling by-products therefrom, thus obtaining a high purity propylene oxide.

In order to carry out the process of the present invention advantageously on an industrial scale, it is essential to control the column pressure in the column 2 within the particular range as specified above. That is to say, the column pressure must be maintained in the range between the lowest pressure which can maintain a temperature at least high enough for effecting the thermal decomposition of the unreacted peracetic acid contained in the reaction mixture in a minute quantity and the highest pressure which can maintain a temperature low enough for avoiding the reaction of propylene oxide with acetic acid. We have investigated the relationship between the pressure and the temperature of the reaction mixture, as well as the behaviors of the substances involved under such pressure and temperature reaction conditions and have discovered that the pressure of the first pressure still column 2 should be maintained within the range of 1.3–5.0 kg./cm.$^2$.

As an example, the operation pressure, the column bottom temperature and the loss of propylene oxide owing to its reaction with acetic acid within the still column 2, when the reaction mixture was fed to the 10th plate of a 22 plate still column, were as follows:

| Operation pressure (column head) (kg./cm.$^2$) | Column head temp. (° C.) | Column bottom temp. (° C.) | Degree of peracetic acid decomposition | Loss of propylene oxide (percent by weight) |
|---|---|---|---|---|
| 1.0 | 10 | 95 | Incomplete decomposition. | Trace |
| 1.5 | 23 | 105 | Complete decomposition. | Trace |
| 2.0 | 34 | 118 | do | 0.10 |
| 2.4 | 38 | 125 | do | 0.29 |
| 4.8 | 59 | 146 | do | 1.04 |
| 8.1 | 104 | 187 | do | 9.9 |

From this table, it will be apparent that, when the reaction mixture is distilled under a pressure of 8.1 kg./cm.$^2$, 9.9 percent of the fed propylene oxide will be lost owing to the above-mentioned esterification reaction, whereas the loss of propylene oxide will be reduced to less than about 1 percent at a pressure of less than 5.0 kg./cm.$^2$.

Also, the column bottom temperature will be only 95° at most under an operation pressure of 1.0 kg./cm.$^2$, whereby nondecomposed peracetic acid will be contained in the bottom product.

Further, the above pressure and temperature conditions in the process of the present invention will make it possible to use industrial water as the cooling water for the still head condenser, since the still head temperature will be raised by elevation of the column operation pressure. The use of industrial water will reduce the operational cost of the process of the present invention and will make the process economically advantageous.

We have also discovered that a mixture of propylene and propylene oxide can be compressed with safety and also that propylene oxide is not lost owing to its polymerization or any other reaction during the compression of the gaseous mixture in the process of the present invention. The gaseous mixture of propylene and propylene oxide can be liquefied by compressing the same under a pressure of 10–20 kg./cm.$^2$ at room temperature, although the required pressure may vary depending on the composition of the gaseous mixture. The gaseous mixture can also be liquefied by cooling the same to a low temperature without compression. In the latter case, for example, a coolant below −50° C. should be passed to the cooler 5 wherein the distillate containing propylene oxide, which is distilled over the still head of the first pressure still column 2, will be liquefied by cooling the liquefied distillate, will be fed to the second pressure still column 14 through the pump 9 and the piping 10. The noncondensing gases other than propylene and propylene oxide will be released out of the system from the piping 11 after the separation of the condensed liquid.

The operation conditions in the distillation column 14 under pressure for separating propylene oxide from propylene are not critical, since both components do not react with each other. Accordingly, they can be separated with good yields by a pressure distillation process under conventional operation conditions. In this second distillation process, the pressure in the column 14 will be usually kept within the range of 6 to 25 kg./cm.$^2$, preferably 10 to 16 kg./cm.$^2$. The column head temperature will be usually maintained in the range of 0 to 50° C., preferably 10 to 40° C. The column bottom temperature will be maintained below 160° C. so that the polymerization of propylene oxide does not occur.

The propylene oxide product obtained according to the process of the present invention may sometimes still contain minute amounts of acetaldehyde and the solvent used such as ethyl acetate, but these minor impurities can be removed very easily by an ordinary distillation technique.

The present invention will be now explained with reference to an illustrative nonlimiting example. In the example all the percentages and parts are by weight.

Example

A reaction mixture discharged from a reactor after the epoxidizing reaction under pressure for producing propylene oxide had a composition of 15.30 percent of propylene oxide, 11.15 percent of propylene, 41.70 percent of ethyl acetate, 28.68 percent of acetic acid and 0.54 percent of peracetic acid and, in addition, it contained a small amount of gases and low and high boiling liquids as by-products. This reaction mixture was fed to the first pressure still column 2 (in the flow sheet of the drawing), which was maintained at a pressure of 2.1 kg./cm.$^2$, at a rate of 1034 parts per hour. The column 2 was operated with a reflux ratio of 10; the column head and bottom temperatures were 53° C. and 120° C., respectively. Propylene oxide and acetic acid was separated promptly in the still column 2 and a bottom product containing 43.11 percent of acetic acid and 53.0 percent of ethyl acetate was withdrawn from the column bottom at a rate of 691 parts per hour. An analysis of the bottom product revealed the absence of peracetic acid in said bottom product and this indicates that the unreacted peracetic acid had been completely decomposed thermally during the distillation in the column 2.

The overhead distillate from the column head 4 was cooled in the cooler 5 by cooling water at 2° C. and the noncondensing substance was sent to the compressor 12 at a rate of 132 parts per hour. The composition of said condensed substance was 77.34 percent of propylene and 20.15 percent of propylene oxide, the rest being gases formed by decomposition such as oxygen and low boiling by-products such as acetaldehyde. This mixture was compressed at a pressure of 13.5 kg./cm.$^2$ by the compressor 12, and then was cooled and liquefied by cooling water at 2° C. in the cooler 13 and then was fed to a middle plate of the pressure still column 14.

On the other hand, a part of the condensate condensed in the cooler 5 was refluxed to the column head of the still column 2. The rest of the condensate was sent to the second pressure still column 14 from the reservoir 6 through the piping 8 at a rate of 212 parts per hour by means of the pump 9. The condensate contained 62.00 percent of propylene oxide, 30.42 percent of ethyl acetate, 6.08 percent of propylene and the balance was impurities such as acetaldehyde.

The pressure still column 14 was operated under a pressure of 13.5 kg./cm.$^2$, and the column head and bottom temperatures were 35.5° C. and 129.2° C., respectively. A gaseous mixture containing propylene, oxygen and other gases was distilled off the still head 15 at a rate of 117 parts per hour, while, from the column bottom 21, was withdrawn the bottom product containing propylene oxide and free of propylene at a rate of 226 parts per hour. The composition of the bottom product was 69.60 percent of propylene oxide, 28.70 percent of ethyl acetate and minute amounts of acetaldehyde and other low boiling by-products.

Ethyl acetate and the above minor impurities were removed from the bottom product by means of an ordinary distillation and propylene oxide having a purity of 99.65 percent was finally obtained.

In this example, a total of 1263 parts of propylene oxide were fed to the still column 2 during a period of 8 hours and 1260 parts of the same was recovered as the bottom product of the pressure still column 14. Thus, loss of propylene oxide was merely 0.24 percent of the fed amount.

The embodiments of the invention in which an exclusive property or privilege is claimed are defined as follows:

1. A process for purifying propylene oxide using, as a starting material, an impure reaction mixture containing propylene oxide, propylene, peracetic acid, acetic acid and reaction solvent, which comprises feeding the impure reaction mixture into a first distillation zone and therein subjecting said reaction mixture to distillation under a pressure within the range of 1.3 to 5.0 kg./cm.$^2$ in order to thermally decompose peracetic acid and to separate the reaction mixture into a low boiling point fraction and a high boiling point fraction, withdrawing from the bottom of the first distillation zone the high boiling point fraction containing acetic acid and solvent, substantially free of peracetic acid, withdrawing from the top of the first distillation zone the low boiling point fraction containing propylene oxide and propylene, liquefying the low boiling point fraction, feeding said liquified low boiling point fraction into a second distillation zone and therein subjecting said liquified low boiling point fraction to distillation, and recovering from the bottom of the second distillation zone propylene oxide, substantially free of propylene.

2. The process as claimed in claim 1, wherein said impure propylene oxide mixture is obtained from an epoxidizing reaction of propylene with peracetic acid as the oxidizing agent for producing propylene oxide.

3. The process as claimed in claim 1, in which the liquifying of the low boiling point fraction is carried out by first cooling said low boiling point fraction to convert a part of same to a first liquid, feeding a portion of said first liquid to said first distillation zone as a reflux, condensing the remainder of said low boiling point fraction to obtain a second liquid and then feeding said second liquid and the remainder of said first liquid to said second distillation zone.

References Cited

UNITED STATES PATENTS 3,350,417 10/1967 Binning et al. _____ 203—75
3,398,062 8/1968 Tsao et al. _____ 203—80
3,476,776 11/1969 Sennewald et al. ___ 260—348.5

WILBUR L. BASCOMB, JR., Primary Examiner

U.S. Cl. X.R.

203—87, 26, Dig 9; 260—348.5 L